July 7, 1925.
B. A. LAKE
1,545,108
CORN HUSKING MACHINE
Filed Sept. 4, 1924
2 Sheets-Sheet 2
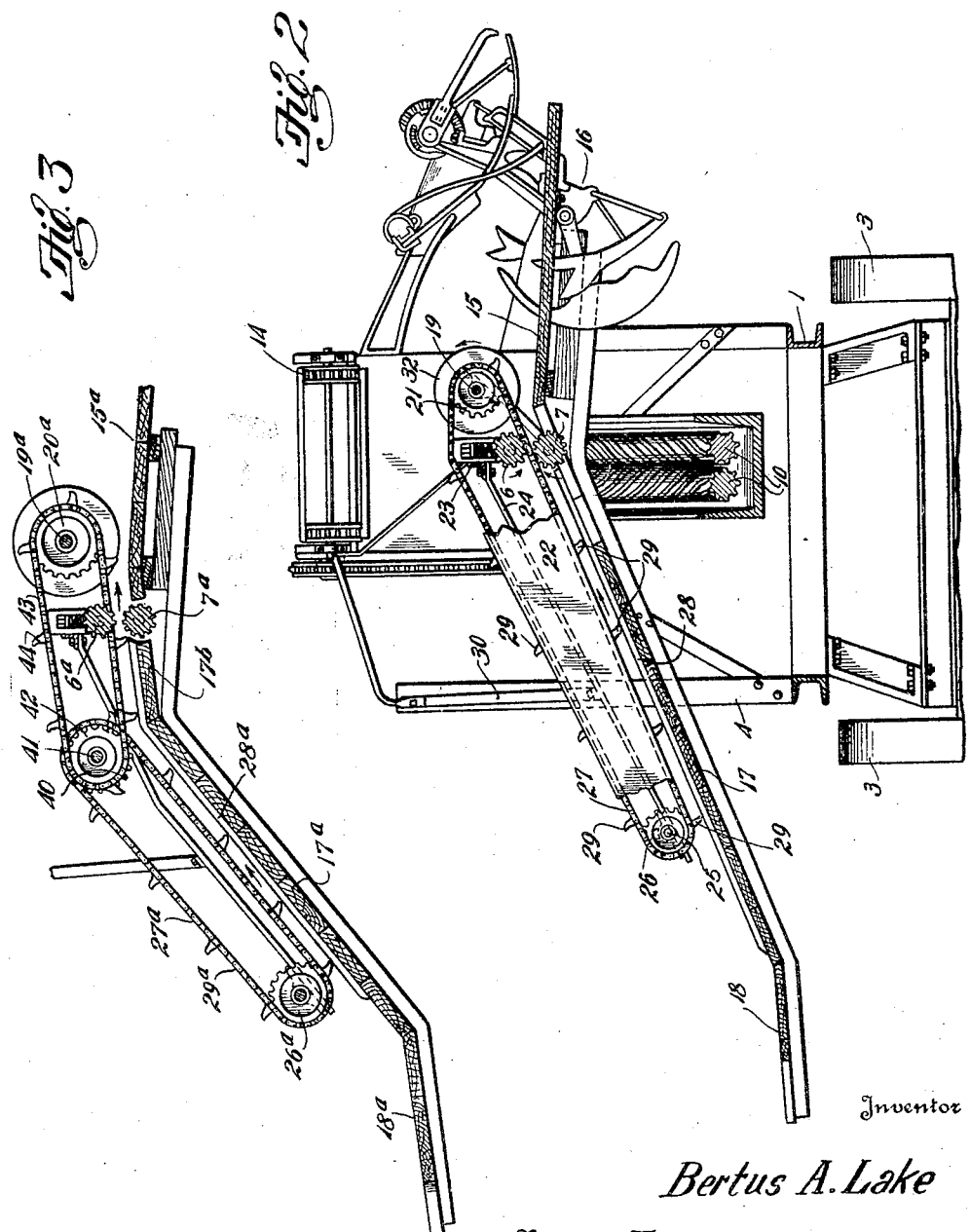
Inventor
Bertus A. Lake
By Frease and Bond
Attorneys Patented July 7, 1925.

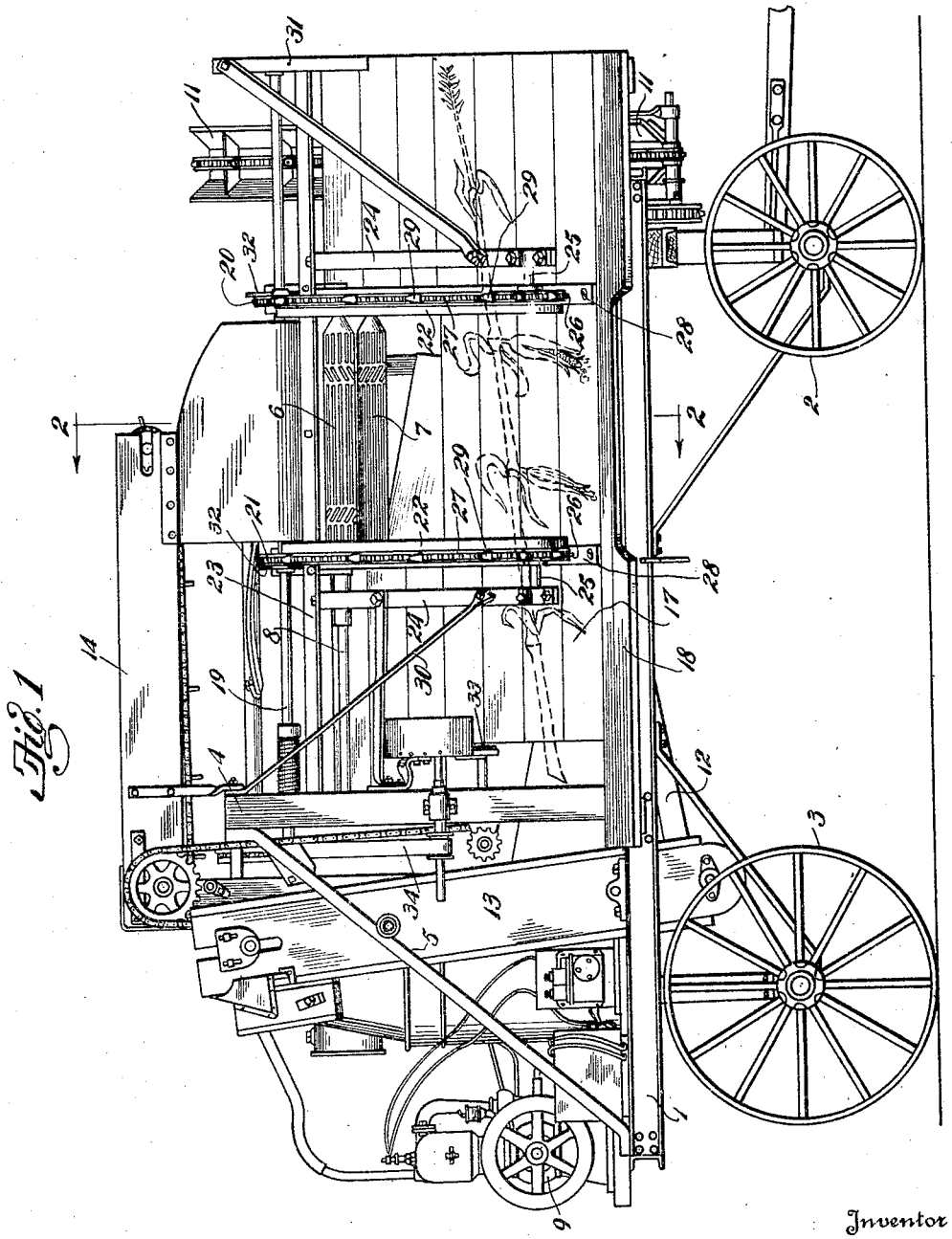

1,545,108

UNITED STATES PATENT OFFICE.

BERTUS A. LAKE, OF BIG PRAIRIE, OHIO.

CORN-HUSKING MACHINE.

Application filed September 4, 1924. Serial No. 735,793.

To all whom it may concern:

Be it known that I, BERTUS A. LAKE, a citizen of the United States, residing at Big Prairie, in the county of Holmes and State of Ohio, have invented certain new and useful Improvements in Corn-Husking Machines, of which the following is a specification.

This invention relates to machines for husking corn and more especially to an improved mechanism for feeding the stalks to the snapping rolls of corn husking machines of the general type shown in the Tschantz Patent No. 1,155,173 of September 28, 1915 and my prior Patent No. 1,438,383 of December 12, 1922; the present improvement being a development of both of said patents which are at present owned by me.

In both of the above named patents the feeding mechanism is arranged to carry the stalks to the snapping rolls at a slight angle, the head of the stalk reaching the rolls slightly ahead of the butt end thereof.

The usual feeding mechanism employed in machines of this general type comprises a plurality of conveyer chains upon which the stalks are placed, lugs being located at spaced points upon the chains to engage the stalks and carry them in the desired position to the rolls.

In order to prevent the stalks from "bunching" upon the chains, resilient fingers have been used to hold the stalks back, but considerable difficulty has been experienced with the use of such conveyers, to uniformly feed the stalks to the rolls.

The object of the present invention is to improve the feeding mechanism whereby the stalks are fed at a uniform rate of speed, to the snapping rolls, thus obtaining the maximum amount of work from the machine.

The above and other objects may be attained by providing spaced conveyer chains above the feed table, the chain at the head end being driven slightly faster than the chain at the butt end, each chain having lugs arranged to drag upon the table and engage the stalks, sliding the stalks upward along the feed table and passing them into the rolls at the desired angle.

An embodiment of the invention is illustrated in the accompanying drawings, in which—

Figure 1 is a side elevation of a corn husking machine provided with the improved feeding mechanism;

Fig. 2, a transverse sectional view of the same on the line 2—2, Fig. 1; and

Fig. 3, a similar view of a slightly modified form of the invention.

Similar numerals indicate corresponding parts throughout the drawings.

The machine illustrated is provided with traction wheels and adapted to be propelled or drawn across the corn field and moved into position adjacent to the shocks of corn.

The stalks are removed from the shock and placed upon the feed table of the machine, where they may be spread out and engaged by the conveyer which automatically feeds the stalks diagonally to the snapping rolls, where the ears are removed from the stalks, which are passed on to a binder, the ears dropping upon the husking rolls where the husks are removed and conveyed to the binder, the ears being passed on to a conveyer which carries them to an adjacent wagon, or the like.

The machine may be mounted upon the frame 1, supported above the ground by the front and rear wheels 2 and 3 respectively. Standards 4 may be supported upon the rear portion of the frame for carrying the snapping and husking mechanism, and are preferably braced upon their rear side by the brace bars 5.

The upper and lower snapping rolls 6 and 7 respectively, are journaled in the upper portion of the machine in usual manner, each being provided with a shaft of reduced diameter, as shown at 8, and are arranged to be driven, in the direction of the arrows in Fig. 2, by suitable gearing (not shown) connected to the engine 9.

Beneath the snapping rolls, in position to receive the ears as they are snapped from the stalks, by the snapping rolls, are the forwardly and downwardly inclined husking rolls 10 of any suitable construction.

The husked ears are carried down the husking rolls, in usual manner, and may be deposited in the conveyer 11, which carries them to a wagon or other receptacle adjacent to the machine.

As the ears are husked, the husks are deposited in a rearwardly disposed conveyer 12, and carried thereby to the lower end of the upright conveyer 13, by which they are elevated to the forwardly disposed conveyer 14, which in turn deposits the husks upon the binder table 15, located upon the far side of the snapping rolls, in position to receive the stalks as they are passed through the snapping rolls.

A binder 16, is mounted upon the binder table, and driven by an ordinary connection with the engine, for the purpose of binding the stalks and husks in sheaves and depositing them upon the ground or other suitable place, at one side of the machine.

This much of the machine is substantially the same as shown in the prior patents, above referred to, and since the present improvement relates to the feeding mechanism, it is believed that this general description of these portions of the machine will suffice.

The feeding mechanism to which the invention more particularly pertains, includes the inclined feed table 17, inclined downward from the snapping rolls, upon the feed side of the machine and terminating in the substantially horizontal shelf 18, upon which the stalks may be placed, and spread out in position to be fed upward to the snapping rolls.

A shaft 19 is located slightly above the snapping rolls, upon the delivery side of the machine, and arranged to be driven in the direction of the arrow shown in Fig. 2, by any suitable connection with the engine.

Sprocket wheels 20 and 21 are fixed upon the front and rear portions of the shaft 19, adjacent to the front and rear ends respectively of the snapping rolls, the sprocket 20 being preferably larger in diameter than the sprocket 21.

A strip 22 is connected to the angle iron 23, adjacent to each end of the snapping rolls, and extends downward, substantially parallel to the feed table. Spaced from the outer side of each strip 22, is a bar 24, parallel therewith, and supported at its upper end upon the angle iron 23.

The bars 24 may be braced, from points near their lower ends, by the brace bars 30, connected to any suitable portion of the machine, such as the uprights 4 and 31.

The lower portions of each strip and bar form bearings for a sprocket shaft 25, carrying a sprocket wheel 26. A conveyer chain 27, is carried between each sprocket wheel 26 and the corresponding upper sprocket 20 or 21. Metal plates 28 are fixed on the feed table beneath the chains 27, upon which the teeth or lugs 29 of the under strands of the chains, are arranged to drag, as the chains move in the direction of the arrow in Fig. 2.

A circular saw 33, may be located near the rear edge of the table in position to cut off the butt ends of the stalks as they are carried thereby, said saw being driven by any suitable gearing, as shown at 34, which may be connected to the engine or other source of power.

For the purpose of quickly releasing the stalks from the feed chains, after they have passed through the snapping rolls, a disk 32, of considerably greater diameter than the adjacent sprocket wheel, is mounted upon one side of each sprocket 20 and 21.

Attention is called to the construction shown in the drawings, whereby each of the feed chains passes between the snapping roll shafts, near the ends of the rolls, and returns over bearings for the upper snapping roll.

In operating the machine, the stalks are removed from the shock and piled upon the horizontal shelf 18, at the lower end of the feed table, where they may be spread out and pushed beneath the conveyer chains 27, the lugs 29 therein picking up the stalks and carrying them to the snapping rolls.

Since the sprocket wheel 20 is of greater diameter than the wheel 21, it is obvious that the head end of the stalk will be carried slightly ahead of the butt end, the stalks traveling up on the table in substantially the position shown in dotted lines in Fig. 1.

It is well known that as corn ripens and matures, the weight of the ears will cause the stem of each ear to bend downward, leaving the ripened ears of corn extending downward at an angle, away from the stalk.

It will thus be seen that if the stalks were fed parallel to the snapping rolls, the ears would not be carried into engagement with the rolls at right angles thereto and a great deal of corn would be shelled from the side of the ear, coming into contact with the snapping rolls.

By the present construction, however, in which the head end of the stalk is carried into the snapping rolls ahead of the butt end, the ears reach the snapping rolls in a position at substantially right angles to the snapping rolls, and are cleanly snapped from the stalks as they engage the rolls.

The detached ears drop upon the husking rolls where the husks are torn therefrom and carried rearward and upward by the conveyers above described, and deposited upon the binder table with the stalks which, as they pass through the snapping rolls, are disengaged from the lugs upon the feed chain by means of the disks 32 and dropped upon the binder table.

The husked ears are carried down upon the husking rolls and deposited in the conveyer 11 which carries them to the wagon or other receptacle adjacent to the husking machine. The stalks and husks are bound in sheaves by the binder and ejected therefrom upon the ground at one side of the husking machine.

In Fig. 3 is shown a slight modification of the feeding mechanism in which two feed chains are used at each end of the rolls, one chain carrying the stalks up the inclined feed table to a point adjacent to the snapping rolls, and a second chain picking up the stalks at this point and carrying them through the snapping rolls, the construction being otherwise as that shown in Figs. 1 and 2.

In this form of the invention, the feed table 17$^a$ and shelf 18$^a$ are of substantially the same form as in the other form of the invention, the feed table having an angular, almost horizontal, extension 17$^b$ at its upper end communicating with the binder table 15$^a$.

The feed chain 27$^a$ is provided with the lugs 29$^a$ arranged to drag upon the plate 28$^a$ on the feed table, and is extended over the lower sprocket wheel 26$^a$ and an upper sprocket wheel 40 mounted upon a shaft 41 located near the upper end of the feed table, upon the entrance side of the snapping rolls.

A sprocket 42 is mounted upon the shaft 41, adjacent to the sprocket 40, and a conveyer chain 43, provided with lugs 44, is extended over said sprocket and over the sprocket 20$^a$ mounted upon the shaft 19$^a$ upon the delivery side of the snapping rolls, said chain passing through the snapping rolls 6$^a$ and 7$^a$ in the direction of the arrow and back over the top of the bearing after the upper roll.

It will be seen that in this form of the invention the stalks are carried up upon the feed table in the same manner as above described, the lower strand of the chain holding the stalks upon the table, while the lugs upon the chain drag the stalk upward upon the table, to the rolls.

From the above it will be seen that the difficulties experienced in the old form of feeding mechanism are overcome, since no tension mechanism is necessary to prevent bunching of the stalks which may be separated upon the shelf and fed evenly by the feeding mechanism, which will hold each stalk in place as it is picked up by the lugs and carry the stalk in proper position into and through the husking rolls.

I claim:—

1. A corn husking machine including a pair of snapping rolls, a feed table adjacent to the rolls and conveyer chains above the table and provided with lugs arranged to drag upon the table for carrying stalks sidewise to the rolls.

2. A corn husking machine including a pair of snapping rolls, and conveyer chains passing between the rolls for carrying stalks sidewise through the rolls.

3. A corn husking machine including a pair of snapping rolls having reduced shaft portions at opposite ends, and conveyer chains passing between said shaft portions for carrying stalks sidewise to the rolls.

4. A corn husking machine including a pair of snapping rolls, a conveyer chain near each end of the rolls for carrying stalks sidewise to the rolls, and means for driving one chain faster than the other chain.

5. A corn husking machine including a pair of snapping rolls, a sprocket drive shaft adjacent to the rolls, a large sprocket upon the shaft near the head end of the rolls, a small sprocket upon the shaft near the butt end of the rolls, and conveyer chains connected to said sprockets for carrying stalks sidewise to the rolls.

6. A corn husking machine including a pair of snapping rolls, a sprocket drive shaft adjacent to the rolls, sprockets upon said shaft, conveyer chains connected to the sprockets for carrying stalks sidewise to the rolls, and disks upon said sprockets for quickly releasing the stalks from the conveyer chains.

7. A corn husking machine including a pair of snapping rolls, a feed table adjacent to said rolls, a sprocket shaft above the table upon each side of the rolls, conveyer chains connected to said sprocket shafts and lugs upon said chains arranged to drag upon the table for carrying stalks sidewise to the snapping rolls.

8. A corn husking machine including a pair of snapping rolls, a feed table adjacent to said rolls, a sprocket shaft above the table upon each side of the rolls, conveyer chains connected to said sprocket shafts, the lower strand of each chain passing between the rolls, and lugs upon said chains arranged to drag upon the table for carrying stalks sidewise to the snapping rolls.

9. A corn husking machine including a pair of snapping rolls, a feed table adjacent to said rolls, a sprocket shaft above the table upon each side of the rolls, conveyer chains connected to said sprocket shafts, the lower strand of each chain passing between the rolls, lugs upon said chains arranged to drag upon the table for carrying stalks sidewise to the snapping rolls, and disks upon the shaft on the delivery side of the rolls for quickly releasing the stalks from said lugs.

In testimony that I claim the above, I have hereunto subscribed my name.

BERTUS A. LAKE.